United States Patent
Ichihashi

(10) Patent No.: US 11,209,162 B2
(45) Date of Patent: Dec. 28, 2021

(54) COMBUSTOR PANEL STUD COOLING EFFUSION THROUGH HEAT TRANSFER AUGMENTORS

(71) Applicant: United Technologies Corporation, Farmington, CT (US)

(72) Inventor: Fumitaka Ichihashi, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 80 days.

(21) Appl. No.: 16/725,116

(22) Filed: Dec. 23, 2019

(65) Prior Publication Data

US 2020/0217507 A1 Jul. 9, 2020

Related U.S. Application Data

(60) Provisional application No. 62/788,613, filed on Jan. 4, 2019.

(51) Int. Cl.
*F23R 3/00* (2006.01)
*F23R 3/06* (2006.01)
*F02C 7/18* (2006.01)
*F23R 3/60* (2006.01)

(52) U.S. Cl.
CPC .............. *F23R 3/005* (2013.01); *F23R 3/002* (2013.01); *F23R 3/06* (2013.01); *F02C 7/18* (2013.01); *F23R 3/60* (2013.01); *F23R 2900/03041* (2013.01); *F23R 2900/03045* (2013.01)

(58) Field of Classification Search
CPC ............ F23R 3/002; F23R 2900/03041; F23R 2900/03042; F23R 2900/03044; F23R 2900/03045; F23R 3/005; F23R 3/06; F23R 3/60
See application file for complete search history.

(56) References Cited

U.S. PATENT DOCUMENTS

| | | | |
|---|---|---|---|
| 6,857,275 B2 | 2/2005 | Pidcock et al. | |
| 9,518,737 B2 * | 12/2016 | Pidcock | F23R 3/002 |
| 9,625,152 B2 | 4/2017 | Papple et al. | |
| 10,731,562 B2 * | 8/2020 | Porter | F23R 3/06 |
| 10,753,608 B2 * | 8/2020 | Cunha | F23R 3/06 |

(Continued)

FOREIGN PATENT DOCUMENTS

| | | |
|---|---|---|
| EP | 3239462 | 11/2017 |
| EP | 3315865 | 5/2018 |

(Continued)

OTHER PUBLICATIONS

European Patent Office, European Search Report dated Mar. 10, 2020 in Application No. 20150376.0.

*Primary Examiner* — William H Rodriguez
(74) *Attorney, Agent, or Firm* — Snell & Wilmer L.L.P.

(57) ABSTRACT

A gas turbine engine component having a first surface in communication with a core airflow. The gas turbine engine component further includes a second surface, different than the first surface, for cooling the first surface. The gas turbine engine component further includes a heat transfer augmentor extending from the second surface. The gas turbine engine component further includes a heat transfer augmentor effusion hole extending through the gas turbine engine component from a sidewall of the heat transfer augmentor to the first surface.

17 Claims, 5 Drawing Sheets

(56) References Cited

U.S. PATENT DOCUMENTS

| | | |
|---|---|---|
| 2017/0176006 A1 | 6/2017 | Gerendas |
| 2018/0292089 A1* | 10/2018 | Porter ........................ F23R 3/60 |
| 2019/0041059 A1* | 2/2019 | Slavens ..................... F23R 3/06 |
| 2019/0078785 A1* | 3/2019 | Propheter-Hinckley ..................... F23R 3/06 |
| 2019/0078786 A1* | 3/2019 | Propheter-Hinckley ..................... F23R 3/60 |
| 2019/0078788 A1* | 3/2019 | Propheter-Hinckley ..................... F23R 3/60 |
| 2019/0078789 A1* | 3/2019 | Lemoine ................. F23R 3/002 |
| 2019/0186740 A1* | 6/2019 | Moura ................... F23R 3/002 |
| 2020/0217506 A1* | 7/2020 | Ichihashi ................ F23R 3/002 |
| 2021/0018173 A1* | 1/2021 | Ichihashi ................ F23R 3/002 |

FOREIGN PATENT DOCUMENTS

| | | |
|---|---|---|
| EP | 3453969 | 3/2019 |
| EP | 3524885 | 8/2019 |
| JP | 2014148938 | 8/2014 |
| WO | 2015050592 | 4/2015 |

* cited by examiner

COMBUSTOR PANEL STUD COOLING EFFUSION THROUGH HEAT TRANSFER AUGMENTORS

CROSS REFERENCE TO RELATED APPLICATIONS

This application claims the benefits of provisional application Ser. No. 62/788,613, filed Jan. 4, 2019 for Combustor Panel Stud Cooling Effusion Through Stand-Off Pins and is incorporated by reference herein.

FIELD

The present disclosure relates generally to gas turbine engines and, more particularly, to a combustor liner of a combustor section of a gas turbine engine having pin effusion holes extending through a panel and a portion of a respective heat transfer augmentor.

BACKGROUND

Gas turbine engines include compressor sections to compress an airflow, combustor sections that combine the airflow with fuel for combustion and generate exhaust, and turbine sections that convert the exhaust into torque to drive the compressor sections. The combustor sections may include a combustor liner which may include an outer shell and an inner panel. One or more heat transfer augmentor may at least partially define a gap between the shell and the panel, and a stud may be used to couple the shell to the panel. It may be desirable to reduce a temperature of the panel during combustion in the combustor section. Effusion holes may extend through the panel to provide such cooling.

SUMMARY

Described herein is a gas turbine engine component having a first surface in communication with a core airflow. The gas turbine engine component further includes a second surface, different than the first surface, for cooling the first surface. The gas turbine engine component further includes a heat transfer augmentor extending from the second surface. The gas turbine engine component further includes a heat transfer augmentor effusion hole extending through the gas turbine engine component from a sidewall of the heat transfer augmentor to the first surface.

Any of the foregoing embodiments may further include a stud configured to secure a second gas turbine engine component to the gas turbine engine component, wherein the heat transfer augmentor has a height extending from the first surface to the second surface, a length extending in a direction from the heat transfer augmentor to the stud, and a width that is greater than the length.

Any of the foregoing embodiments may further include The gas turbine engine component of claim 1, further comprising a stud configured to secure a second gas turbine engine component to the gas turbine engine component, wherein the heat transfer augmentor includes multiple heat transfer augmentors surrounding the stud.

In any of the foregoing embodiments, the heat transfer augmentor effusion hole includes multiple effusion holes each extending through the first surface and portions of respective heat transfer augmentors.

In any of the foregoing embodiments, the heat transfer augmentor effusion hole has an inlet located on the heat transfer augmentor and an outlet in the combustion chamber.

Any of the foregoing embodiments may further include a stud configured to secure a second gas turbine engine component to the gas turbine engine component, wherein the outlet is located at a location aligned with the stud.

Any of the foregoing embodiments may further include at least one panel effusion hole extending through the gas turbine engine component from the second surface to the the first surface.

In any of the foregoing embodiments, the heat transfer augmentor effusion hole extends at an angle relative to a plane defined by a surface of the first surface.

Also disclosed is a combustor panel for a gas turbine engine, the combustor panel including a first surface configured to at least partially define a combustion chamber. The combustor panel further includes a second surface, different than the first surface, for cooling the first surface. The combustor panel further includes a heat transfer augmentor configured to extend from the second surface. The combustor panel further includes a heat transfer augmentor effusion hole extending through the combustor panel from a sidewall of the heat transfer augmentor to the first surface.

In any of the foregoing embodiments, the heat transfer augmentor includes at least one of a stub, a pin, or a rail.

In any of the foregoing embodiments, the heat transfer augmentor has an oblong cross-section.

In any of the foregoing embodiments, the heat transfer augmentor effusion hole includes multiple effusion holes each extending through respective heat transfer augmentors to the first surface.

In any of the foregoing embodiments, the heat transfer augmentor effusion hole has an inlet located on the heat transfer augmentor and an outlet in the combustion chamber.

Any of the foregoing embodiments may further include a stud configured to secure a second gas turbine engine component to the gas turbine engine component, wherein the outlet is located at a location aligned with the stud.

Any of the foregoing embodiments may further include at least one panel effusion hole extending through the gas turbine engine component from the second surface to the the first surface.

In any of the foregoing embodiments, the heat transfer augmentor effusion hole extends at an angle relative to a plane defined by a surface of the first surface.

Any of the foregoing embodiments may further include a stud configured to secure a second gas turbine engine component to the gas turbine engine component, wherein the heat transfer augmentor has a height extending from the first surface to the second surface, a length extending in a direction from the heat transfer augmentor to the stud, and a width that is greater than the length.

Any of the foregoing embodiments may further include a stud configured to secure a second gas turbine engine component to the gas turbine engine component, wherein the heat transfer augmentor includes multiple heat transfer augmentors surrounding the stud.

Also disclosed is a combustor liner for use in a combustor section of a gas turbine engine, the combustor liner including a panel configured to at least partially define a combustion chamber. The combustor liner may further include a shell. The combustor liner may further include a heat transfer augmentor configured to extend from the panel to the shell to at least partially define a gap between the panel and the shell. The combustor liner may further include a pin effusion hole extending through the panel and a portion of the heat transfer augmentor to port a compressed gas through the panel and the portion of the heat transfer augmentor to the combustion chamber.

Any of the foregoing embodiments may further include a stud configured to couple the panel to the shell, wherein the heat transfer augmentor has a height extending from the panel to the shell, a length extending in a direction from the heat transfer augmentor to the stud, and a width that is greater than the length.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
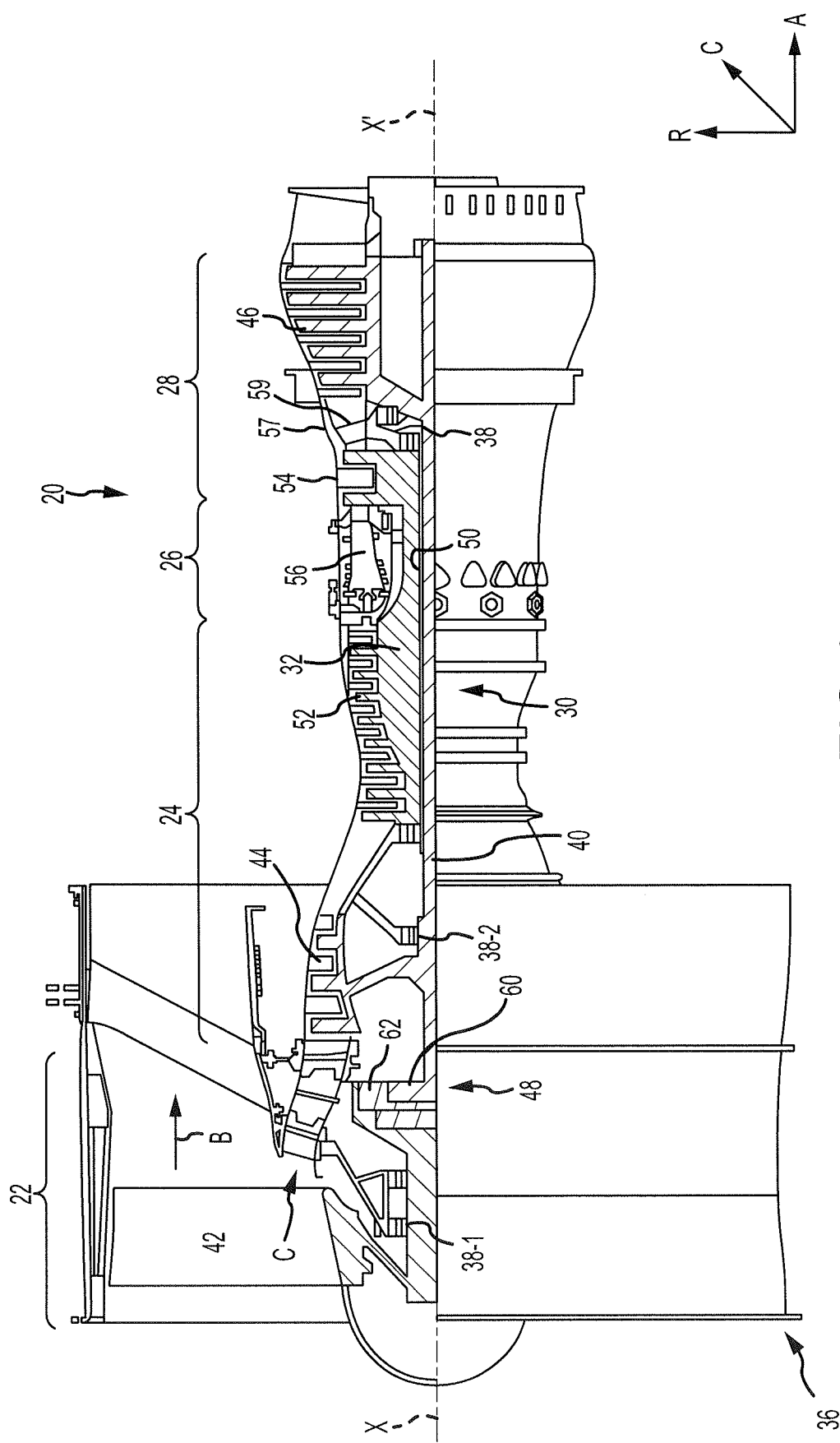
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
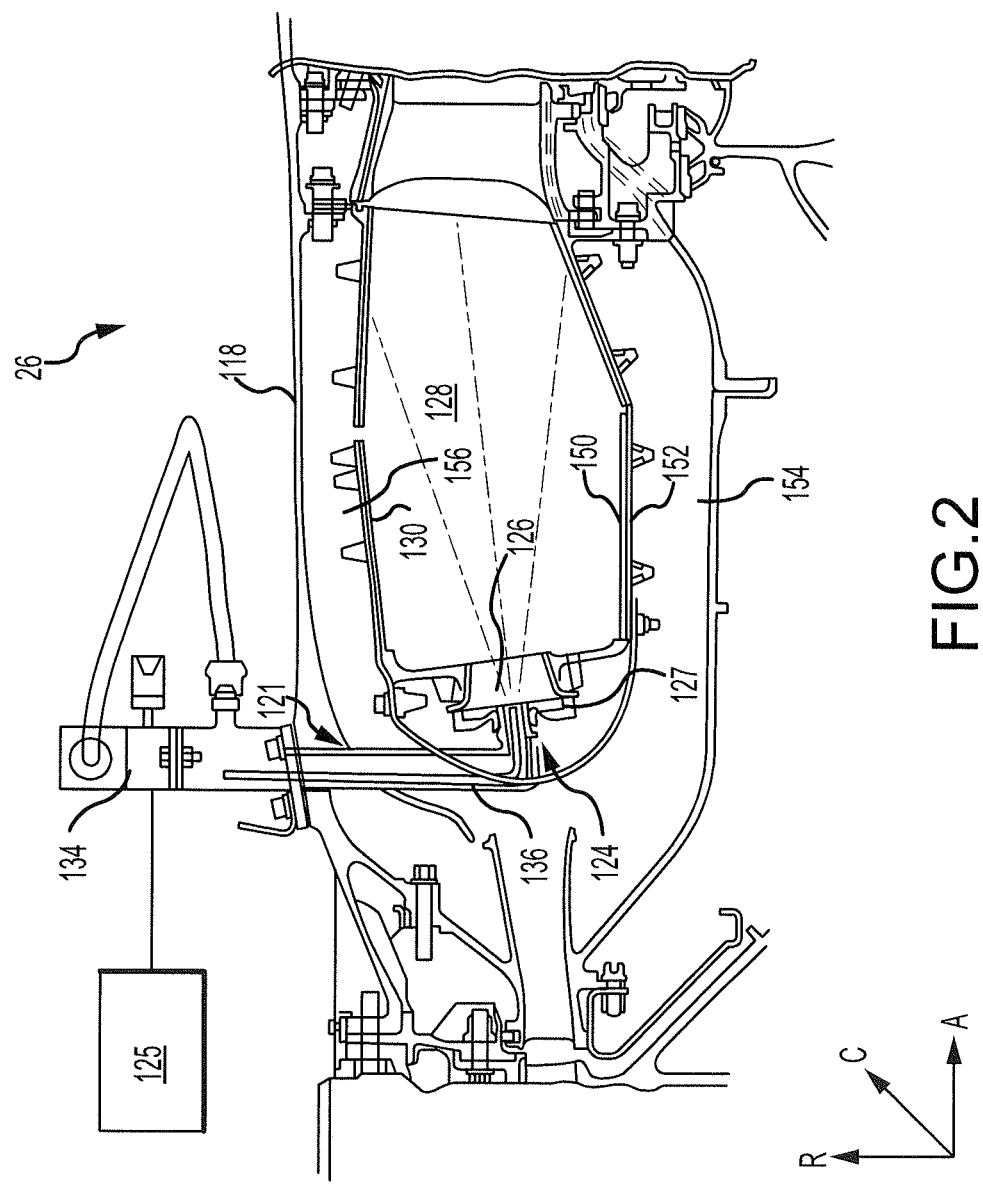
FIG. 2 is a cross-sectional view of a portion of a combustor section of the gas turbine engine of FIG. 1, in accordance with various embodiments.

In various embodiments and referring to FIG. 2, the combustor section 26 may include an annular combustor 132. The annular combustor 132 may include multiple fuel nozzles 124, which each include their own trim valve 134. In various embodiments, each fuel nozzle 124 delivers fuel to a respective section of the combustion chamber 128. The fuel nozzles 124 may be arranged circumferentially around an axis within a combustor 132. The fuel nozzles 124 may include stems 136 that extend from a diffuser case 118 to openings.

Although a single fuel nozzle 124 (and other components) is shown in the drawings, one skilled in the art will realize that the combustor section 26 may include multiple openings circumferentially around the combustor section 26 that receive fuel nozzles 124.

The combustor section 26 may further include a diffuser case 118. The diffuser case 118 surrounds or encloses a combustor liner 130. The combustor liner 130 may partially define a combustion chamber 128. A fuel source 125 provides fuel to the fuel nozzle 124 for delivery to the combustion chamber 128. The fuel nozzle 124 extends through an aperture 121 in the diffuser case 118. An end of the fuel nozzle 124 may be arranged at an inlet 126 of the combustion chamber 128. A swirler 127 (which may include a hole for the fuel nozzle 124) may provide desired airflow motion from the compressor section 24 of FIG. 1 to achieve a desired air/fuel mixture. One or more of the liner and shell assemblies 130 typically include one or more igniters used to begin combustion of the air/fuel mixture.

The diffuser case 118 and the combustor liner 130 may define an outer shroud 156 and an inner shroud 154 therebetween. In various embodiments, air or another compressed gas may flow through at least one of the inner shroud 154 or the outer shroud 156. In various embodiments, the fuel nozzle 124 may extend through the outer shroud 156 and may be extended into the inner shroud 154. The inner shroud 154 and the outer shroud 156 may each be referred to as a diffuser chamber 154, 156.

The liner and shell assembly 130 may include a panel 150 and a shell 152. In various embodiments, the shell 152 may be directly or indirectly coupled to the panel 150 to resist movement of the shell 152 relative to the panel 150. The panel 150 has a hot side that may at least partially define the combustion chamber 128, and a cold side facing the shell 152. The shell 152 may be located between the outer shroud 156 and the panel 150, or between the inner shroud 154 and the panel 150.

Figure 3:
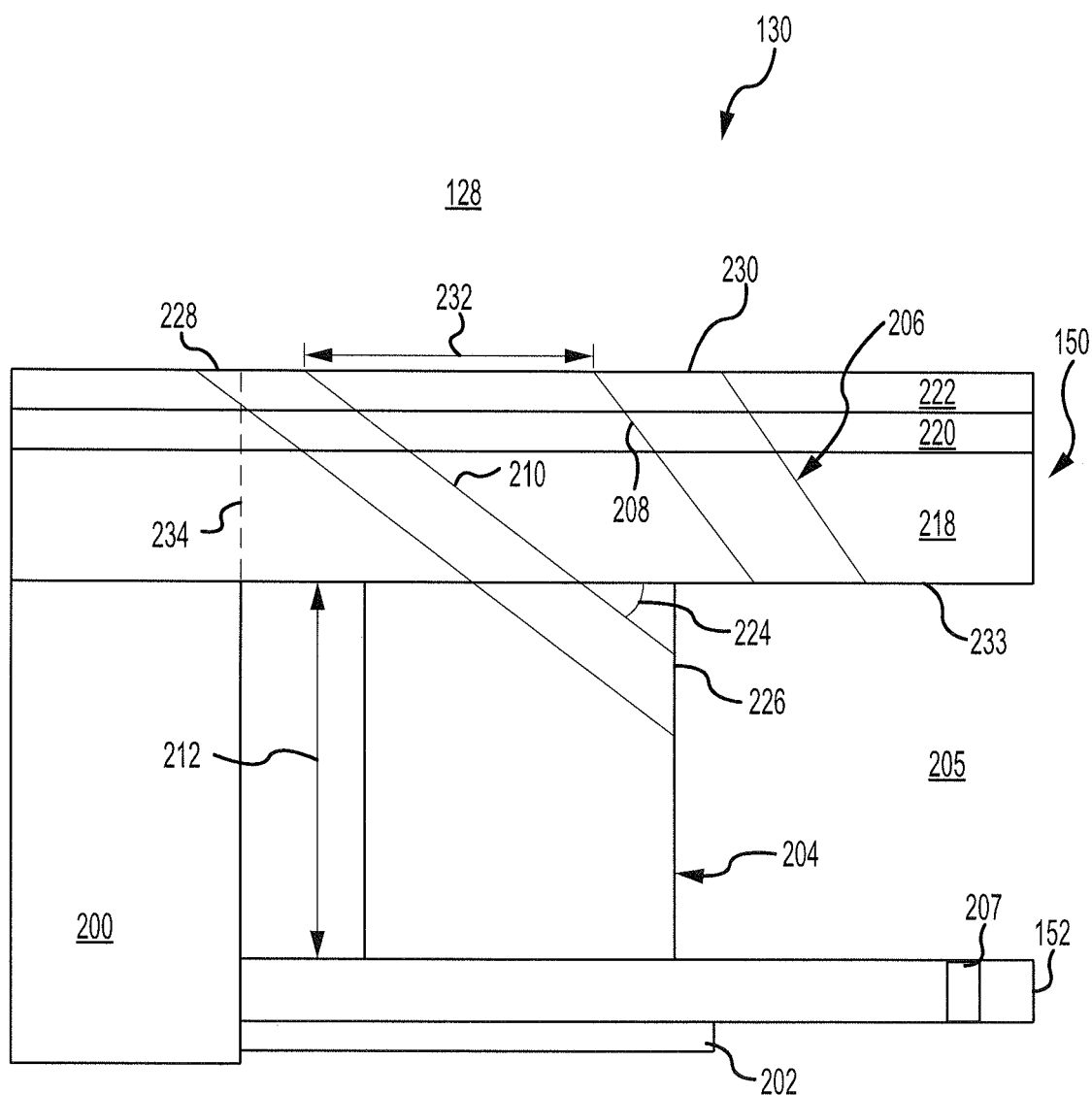
FIG. 3 illustrates a portion of a combustor liner of the combustor section of FIG. 2, in accordance with various embodiments.
Figure 4:
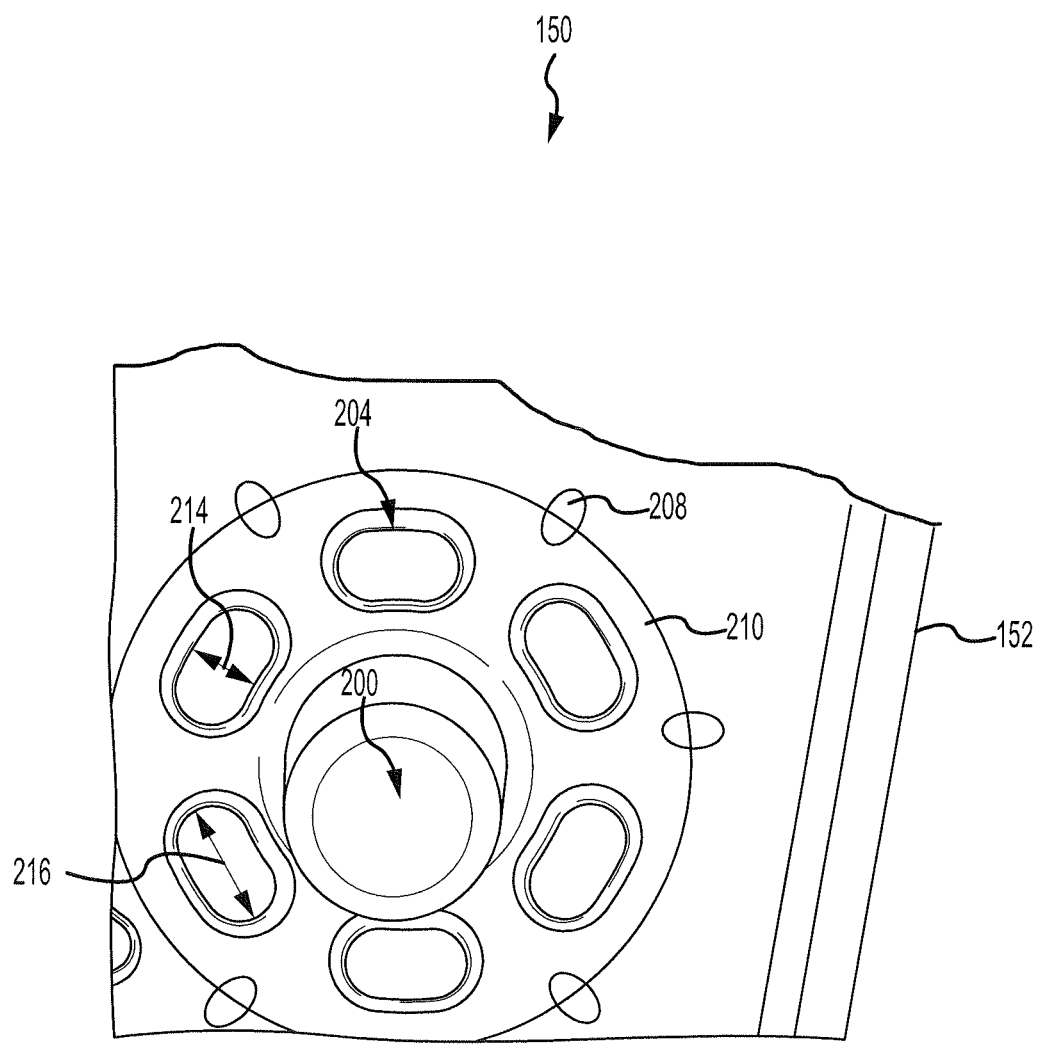
FIG. 4 illustrates the combustor liner of FIG. 3, in accordance with various embodiments.
Figure 5:
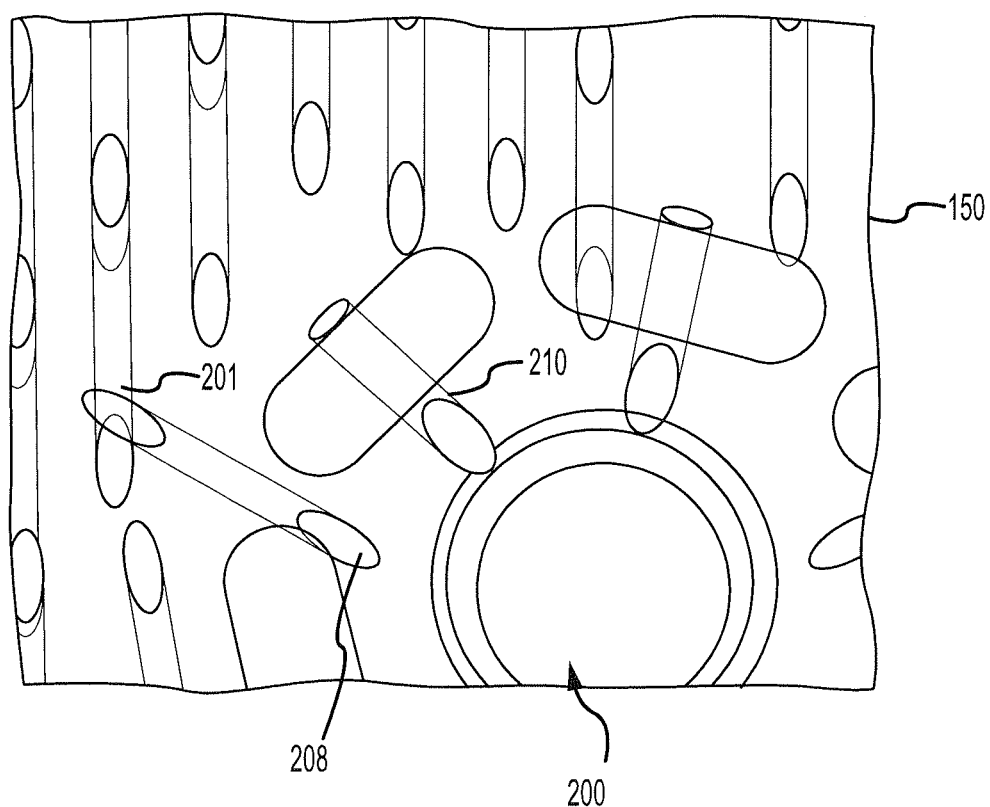
FIG. 5 illustrates a panel of the combustor liner of FIG. 3, in accordance with various embodiments.

Referring now to FIGS. 3, 4, and 5, the liner and shell assembly 130 may include a stud 200 that couples the shell 152 to the panel 150 using a washer 202 and a fastener (not shown). The liner and shell assembly 130 may further include a plurality of heat transfer augmentors 204. The heat transfer augmentors 204 may extend between the panel 150 and the shell and may include any heat transfer augmentor component, such as a stand-off pin. The heat transfer augmentors 204 may extend from the panel 150 to the shell 152 and may resist movement of the panel 150 towards the shell 152. In that regard, the heat transfer augmentors 204 may form a gap 205 between the panel 150 and the shell 152. Although the heat transfer augmentors 204 are shown to be surrounding the stud 200, the present disclosure may be applied to a heat transfer augmentor 204 in any location, such as in a rail or any other augmented section.

The liner and shell assembly 130 may further include effusion holes 206 extending through the panel 150. The effusion holes 206 may include panel effusion holes 208 which extend through the panel 150 alone, and heat transfer augmentor effusion holes 210 which may each extend through the panel 150 and a sidewall portion of a respective heat transfer augmentor 204. The effusion holes 206 may port a cooling fluid such as compressed gas from an area 205 between the panel 150 and the shell 152 into the combustion chamber 128. The augmentor effusion holes 210 may be designed to avoid interacting with the panel effusion holes 208, and vice versa. For example, this design may interact with main panel effusion holes 201, such that the main panel effusion holes 201 may be shifted or placed away from another effusion hole 208, which may result in reduction in temperature. Heat may be transferred from the panel 150 to the compressed gas flowing through the effusion holes 206, thus cooling the panel 150. Impingement holes 207 in the shell 152 introduce the cooling fluid to gap 205.

To facilitate the heat transfer augmentor effusion holes 210 extending through the portions of the respective heat transfer augmentors 204, the heat transfer augmentors 204 may have an oblong shape. In particular, the heat transfer augmentors 204 may have a height 212 extending from the shell 152 to the panel 150, a length 214 extending in a direction from the respective heat transfer augmentor 204 to the stud 200, and a width 216 extending in a direction perpendicular to the length 214 and the height 212. The width 216 may be greater than the length 214 to facilitate the augmentor effusion holes 210 extending through the portion of the respective heat transfer augmentors 204.

The pin effusion holes 210 may have an inlet 226 oriented on the heat transfer augmentor 204 and an outlet 228 located on the panel 150 within the combustion chamber 128. By forming the pin effusion holes 210, a distance 232 between the outlet 228 of the pin effusion hole 210 and an outlet 230 of the panel effusion hole 208 may be reduced. The reduced distance 232 may result in improved cooling of the panel 150 by more evenly distributing heat from the panel 150.

The pin effusion hole 210 may form an angle 224 with a plane defined by a surface 233 of the panel 150. The angle 224 may result in the outlet 228 of the pin effusion hole 210 being aligned with the stud 200. Stated differently, the outlet 228 of the pin effusion hole 210 may at least partially overlap with a projection 234 of the stud 200 through the panel 150. The angle 224 may be, for example, between 1 degree and 89 degrees, between 10 degrees and 80 degrees, between 15 degrees and 75 degrees, or about 20 degrees. Where used in this context, the term "about" refers to the referenced value plus or minus 10 percent.

The panel 150 may include multiple layers. In particular, the panel 150 may include a metal alloy layer 218, a bond coating 220, and a thermal coating 222. The bond coating 220 may bond the thermal coating 222 to the metal alloy layer 218. The thermal coating 222 may include a ceramic or other material that is resistant to heat and may protect the bond coating 220 and the alloy 218 from the relatively great temperatures within the combustion chamber 128.

In various embodiments, the heat transfer augmentors 204 may include multiple heat transfer augmentors. Likewise, the pin effusion holes 210 may include multiple pin effusion holes 210. In various embodiments, the quantity of pin effusion holes 210 may be equal to the quantity of heat transfer augmentors 204.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A gas turbine engine component comprising:
a first surface in communication with a core airflow;
a second surface, different than the first surface, for cooling the first surface;
a heat transfer augmentor extending from the second surface;
a heat transfer augmentor effusion hole extending through the gas turbine engine component from a sidewall of the heat transfer augmentor to the first surface; and
a stud configured to secure a second gas turbine engine component to the gas turbine engine component, wherein an outlet of the heat transfer augmentor effusion hole at least partially overlaps with a projection of the stud on the first surface, the projection being projected through the second surface to the first surface.

2. The gas turbine engine component of claim 1, wherein the heat transfer augmentor has a height extending from the first surface to the second surface, a length extending in a direction from the heat transfer augmentor to the stud, and a width that is greater than the length.

3. The gas turbine engine component of claim 1, wherein the heat transfer augmentor includes multiple heat transfer augmentors surrounding the stud.

4. The gas turbine engine component of claim 3, wherein the heat transfer augmentor effusion hole includes multiple effusion holes each extending through the first surface and portions of respective heat transfer augmentors.

5. The gas turbine engine component of claim 1, wherein the heat transfer augmentor effusion hole has an inlet located on the heat transfer augmentor and the outlet in a combustion chamber.

6. The gas turbine engine component of claim 1, further comprising at least one panel effusion hole extending through the gas turbine engine component from the second surface to the first surface.

7. The gas turbine engine component of claim 6, wherein the heat transfer augmentor effusion hole extends at a first angle relative to a plane defined by a surface of the first surface, wherein the at least one panel effusion hole extends at a second angle relative to the plane, and wherein the first angle is different from the second angle.

8. A combustor panel for a gas turbine engine, the combustor panel comprising:
a first surface configured to at least partially define a combustion chamber;
a second surface, different than the first surface, for cooling the first surface;
a heat transfer augmentor configured to extend from the second surface;
a heat transfer augmentor effusion hole extending through the combustor panel from a sidewall of the heat transfer augmentor to the first surface; and
a stud configured to secure a shell to the combustor panel, wherein an outlet of the heat transfer augmentor effusion hole at least partially overlaps with a projection of the stud on the first surface, the projection being projected through the second surface to the first surface.

9. The combustor panel of claim 8, wherein the heat transfer augmentor includes at least one of a stub, a pin, or a rail.

10. The combustor panel of claim 8, wherein the heat transfer augmentor has an oblong cross-section.

11. The combustor panel of claim 10, wherein the heat transfer augmentor effusion hole includes multiple effusion holes each extending through respective heat transfer augmentors to the first surface.

12. The combustor panel of claim 8, wherein the heat transfer augmentor effusion hole has an inlet located on the heat transfer augmentor and the outlet in the combustion chamber.

13. The combustor panel of claim 8, further comprising at least one panel effusion hole extending through the gas turbine engine component from the second surface to the first surface.

14. The combustor panel of claim 13, wherein the heat transfer augmentor effusion hole extends at a first angle relative to a plane defined by a surface of the first surface, wherein the at least one panel effusion hole extends at a second angle relative to the plane, and wherein the first angle is different from the second angle.

15. The combustor panel of claim 8, wherein the heat transfer augmenter includes multiple heat transfer augmentors surrounding the stud.

16. A combustor liner for use in a combustor section of a gas turbine engine, the combustor liner comprising:
   a panel configured to at least partially define a combustion chamber;
   a shell;
   a heat transfer augmentor configured to extend from the panel to the shell and define a heat transfer augmentor height, the heat transfer augmentor height being equal to a gap between the panel and the shell;
   a pin effusion hole extending through the panel and a portion of the heat transfer augmentor to port a compressed gas through the panel and the portion of the heat transfer augmentor to the combustion chamber; and
   a stud configured to secure the panel to the shell, wherein an outlet of the pin effusion hole at least partially overlaps with a projection of the stud through the panel.

17. The combustor liner of claim 16, wherein the heat transfer augmenter has a length extending in a direction from the heat transfer augmentor to the stud, and a width that is greater than the length.

* * * * *